April 2, 1929.  R. S. RICHARDSON  1,707,417
SYNTHETIC PRODUCTION OF AMMONIA
Filed Dec. 30, 1925  2 Sheets-Sheet 1
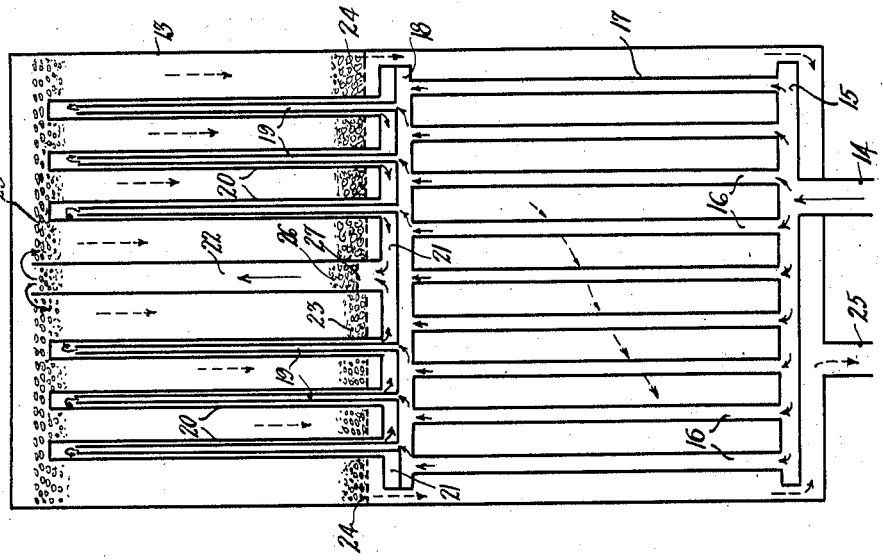
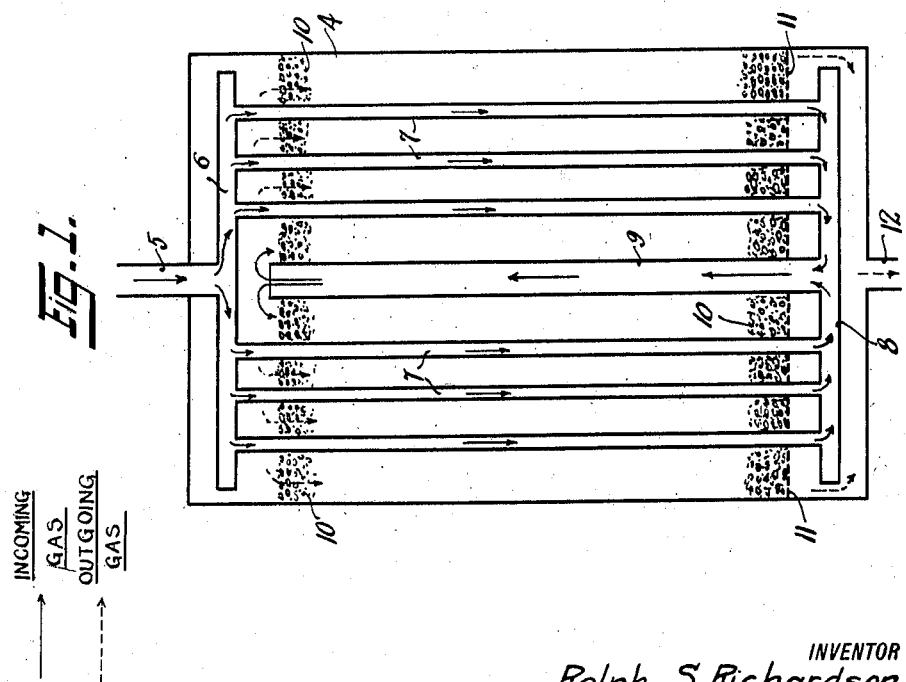
INVENTOR
Ralph S. Richardson
BY
ATTORNEY

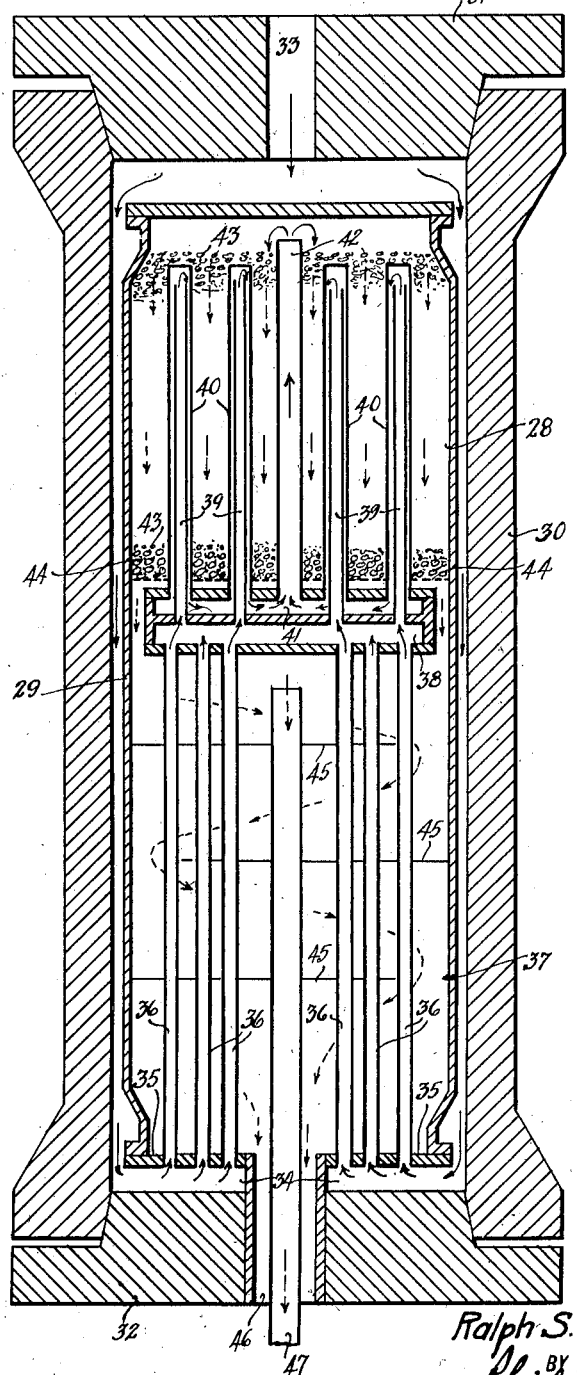

Patented Apr. 2, 1929.

1,707,417

UNITED STATES PATENT OFFICE.

RALPH S. RICHARDSON, OF TEANECK, NEW JERSEY, ASSIGNOR TO NITROGEN ENGINEERING CORPORATION, OF NEW YORK, N. Y., A CORPORATION OF NEW YORK.

SYNTHETIC PRODUCTION OF AMMONIA.

Application filed December 30, 1925. Serial No. 78,286.

My invention relates broadly to improved methods for controlling the temperatures in the catalyst used and has for its object to increase the output of ammonia to the maximum point.

In the synthesis of ammonia the combined nitrogen and hydrogen gases are compressed to an elevated pressure, heated to a suitable temperature ranging from 400° to 600° C. and passed over a suitable catalytic agent whereby a certain proportion of the combined gases is converted into ammoina. In industrial practice the pressure of the nitrogen-hydrogen gases in contact with the catalyst is constant or nearly so; any change in pressure is usually occasioned merely by resistance to the gaseous flow through the catalyst.

In industrial operations many difficulties are encountered in maintaining the catalyst at an optimum temperature after being initially heated from within, since variations of such temperature in either direction lowers the conversion efficiency of the catalyst with decreased yields. It has been found that too low temperatures greatly decrease the activity of the catalyst, so that cooling takes place below that required to maintain the reaction, and therefore production of ammonia ceases entirely.

Furthermore in industrial practice on a commercial scale, it has been found that the portion of the catalyst which first comes in contact with the gas mixture where the activity is more intense, may become injured by overheating or even poisoned by impurities in the gases. Even though such heat is removed by suitable cooling surfaces surrounding that portion of the catalyst, yet local overheating is likely to occur in the catalyst mass.

Heretofore removal of the heat of reaction has been accomplished throughout the catalyst in practice by use of heat transfer surfaces suitably disposed within the catalyst mass, but such system of control inevitably permits great differences in temperature in various isolated parts of the catalyst mass, and especially allows no adequate control of temperature capable of being varied with operating conditions to secure optimum temperatures for maximum conversion.

According to my invention heat is transferred from the catalyst zone to cooler gases on the way to the catalyst so that the greater transfer of heat is attained in those portions of the catalyst mass where greater quantities of heat are produced, and less transfer of heat in those portions of the catalyst where less heat is produced, with the result that the temperature throughout the entire catalyst mass may be maintained at the optimum temperature to produce the maximum output of ammonia.

According to another aspect of my invention the gas may be supplied to the first portion of the catalyst, where the reaction takes place rapidly, at a somewhat lower temperature than the optimum temperature for the bulk of the catalyst. In carrying out my improved methods the heat of reaction is transferred to the gaseous mixture on its way to the reaction by passing this mixture in a plurality of streams within the major portion of the catalyst in unrestricted heat exchange relationship with the catalyst but not in actual contact with the catalyst mass in such manner that the flow of cooling gases is in the same direction as the flow of gases through the interior of the major portion of the catalyst.

The accompanying drawings show in diagrammatic form and in vertical section several forms of apparatus adapted for carrying out the processes of my invention.

Fig. 1 shows the apparatus in its general form with the heat exchange produced by a plurality of gas streams flowing in the same direction as the gas in contact with the catalyst.

Fig. 2 shows the same principle of concurrent heat exchange as in Fig. 1 in connection with a heat exchanger outside the catalyst; and Fig. 3 shows the concurrent flow of heat exchange within the catalyst, the heat exchanger outside the catalyst and the passage of the gases peripherally along the entire length of the walls of the catalyst container on their way to the reaction to prevent undue loss of heat from the catalyst.

Referring to Fig. 1 apparatus, the nitrogen-hydrogen gas mixture at proper pressure and temperature is introduced into the catalyst-containing vessel 4 by the inlet pipe 5 connected with the chamber head 6 and thence through a plurality of vertically extending tubes 7 connected with the lower chamber head 8. The gasses are collected in the head 8 and thence pass upwardly through the center pipe 9 within the interior of the catalyst 10 supported on the perforated plate 11. The gases leaving the top of the pipe 9 are brought into actual contact with the catalyst 10 contained in the spaces around the tubes 7 and pass downwardly through the catalytic body and thereafter through the plate 11 and then pass out of the vessel 5 at the outlet 12.

In the Fig. 2 apparatus the gases pass into the vessel 13 by the inlet 14 to the chamber 15 and thence through the tubes 16 of the outer heat interchanger 17 to the chamber head 18 and then upwardly through a plurality of small tubes 19 telescoped within a like plurality of closed pipes 20 the lower ends of which open into the chamber 21 with the flow of gases downwardly around the walls of the inner tubes 19 and thence to the chamber 21. The gases then pass upwardly through the center pipe 22 within the interior of the catalyst 23 supported on the perforated plate 24. The gases leaving the top of the pipe 22 pass into actual contact with the catalyst 23 packed around the pipes 20 and then pass through the plate 24 and around the chamber head 18 and chamber 21 and between the tubes 16 and thence out of the vessel 13 through the outlet 25. The lower end of the center pipe 22 may contain a small portion of catalyst 26 supported on the screen 27 as shown, the function of which is to raise the temperature of the mixed gases quickly to the optimum temperature. By such method the comparatively high space velocity of the gases in this preliminary catalyst does not allow same to come near the maximum yield of ammonia, yet it actually does produce a comparatively large quantity of ammonia quickly and raises the temperature accordingly. Then the gases (at approximately the optimum temperature) enter the major portion of the catalyst 23 and by the concurrent flow of heat interchange remain at approximately uniform temperature throughout this catalyst 23 as hereinbefore explained.

In the Fig. 3 apparatus, the catalyst furnace 28 is arranged within the upper part of the cylindrical shell 29 set within the converter vessel 30 having the top 31 and bottom 32 strong enough to withstand the high pressures employed. The gases enter through the inlet 23 formed in the top 31 and then pass downwardly in peripheral contact with the side walls of the converter 30 through their entire length and outside the shell 29 and are collected in the chamber 34 formed between the bottom 32 and the bottom plate 35 of the shell 29. From the chamber 34 the gases pass upwardly through the tubes 36 of the outer heat exchanger 37 into the chamber head 38 and then upwardly through a plurality of small tubes 39 telescoped within a like plurality of closed pipes 40 the lower ends of which open into the chamber 41 over the head 38. From the chamber 41 the gases pass upwardly through the center pipe 42 within the interior of the catalyst 43 packed around the pipes 40 supported on the perforated plate 44. The gases leaving the top of the pipe 42 are brought into actual contact with the catalyst 43 contained in the spaces around the pipes 40 and thence pass downwardly through the heat exchanger 37 around the baffle plates 45 to the outlet 46 formed in the bottom 32. Arranged within the outlet 46 is the by-pass pipe 47 through which the hot gases may, if desired, be taken direct from the top of the interchanger 37 without passing around the baffle plate 45.

In all three figures the arrows with the solid lines indicate the path of the gases going to the main catalyst mass while the arrows with the broken lines show the path of the gases in and after passing through the catalyst. In the various forms of apparatus shown it will be noted that the cooler gas in heat exchange relationship with the catalyst mass has the same direction of flow as the gas in actual contact with the catalyst whereby the entire mass of the catalyst may be maintained at optimum temperature for the maximum production of ammonia. Such methods as I have described may be varied in many ways without departing from the nature of the invention and without sacrificing its chief advantages.

I claim as my invention:

1. In the synthetic production of ammonia the method which comprises passing the incoming gases under high pressures and temperatures through the catalyst in heat exchange contiguity, but out of direct contact therewith in one direction and then directly passing the hot gases in the same direction through and in actual contact with said catalyst.

2. In the synthetic production of ammonia the method which comprises passing the incoming gases under high pressures and temperatures through the catalyst in heat exchange contiguity, but out of direct contact therewith by a plurality of separate streams in one direction and then directly passing the hot gases in the same direction through and in actual contact with said catalyst.

3. In the synthetic production of ammonia the method which comprises preheating the incoming gases under high pressures and temperatures from the heat evolved from the reaction by passing same through and in unrestricted thermal contact, but out of direct contact with the catalyst in one direction and then directly passing the hot gases in the same direction through and in actual contact with said catalyst.

4. In the synthetic production of ammonia the method which comprises preheating the incoming gases under high pressures and temperatures from the heat evolved from the reaction by passing same through and in unrestricted thermal contact, but out of direct contact with the catalyst by a plurality of separate streams in one direction and then directly passing the hot gases in the same direction through and in actual contact with said catalyst.

5. In the synthetic production of ammonia the method which comprises enveloping the catalyst with the incoming gases under high pressures and temperatures by passing same peripherally of the catalyst, then passing such gases through the catalyst in heat exchange contiguity, but out of direct contact therewith in the same direction, and finally directly passing the hot gases in the same direction through and in actual contact with said catalyst.

6. In the synthetic production of ammonia the method which comprises enveloping the catalyst with the incoming gases under high pressures and temperatures by passing same peripherally of the catalyst in one direction, then passing such gases through and in unrestricted thermal contact, but out of direct contact with the catalyst in the same direction, and finally directly passing the hot gases in the same direction through and in actual contact with said catalyst.

7. In the synthetic production of ammonia the method which comprises enveloping the catalyst with the incoming gases under high pressures and temperatures by passing same peripherally of the catalyst in one direction, then passing such gases through the catalyst in heat exchange contiguity, but out of direct contact therewith by a plurality of separate streams in the same direction, and finally directly passing the hot gases in the same direction through and in actual contact with said catalyst.

8. In the synthetic production of ammonia the method which comprises enveloping the catalyst with the incoming gases under high pressures and temperatures by passing same peripherally of the catalyst in one direction, then passing such gases through and in unrestricted thermal contact, but out of direct contact with the catalyst by a plurality of separate streams in the same direction, and finally passing the hot gases in the same direction through and in actual contact with said catalyst.

9. In the synthetic production of ammonia the method which comprises enveloping the catalyst with the incoming gases under high pressures and temperatures by passing same peripherally of the catalyst in one direction, then passing such gases in heat exchange contiguity with the hot gases of reaction, then passing such gases through the catalyst in heat exchange contiguity, but out of direct contact therewith in the same direction, and finally directly passing the hot gases in the same direction through and in actual contact with said catalyst.

10. In the synthetic production of ammonia the method which comprises enveloping the catalyst with the incoming gases under high pressures and temperatures by passing same peripherally of the catalyst in one direction, then passing such gases in heat exchange contiguity with the hot gases of reaction, then passing such gases through and in unrestricted thermal contact, but out of direct contact with the catalyst in the same direction, and finally directly passing the hot gases in the same direction through and in actual contact with said catalyst.

11. In the synthetic production of ammonia the method which comprises enveloping the catalyst with the incoming gases under high pressures and temperatures by passing same peripherally of the catalyst in one direction, then passing such gases through the catalyst in heat exchange contiguity, but out of direct contact therewith in the same direction, and then directly passing the hot gases in the same direction through and in actual contact with said catalyst, and finally varying the amount of gases flowing directly fom the catalyst.

12. In the synthetic production of ammonia the method which comprises enveloping the catalyst with the incoming gases under high pressures and temperatures by passing same peripherally of the catalyst in one direction, then passing such gases through and in unrestricted thermal contact, but out of direct contact with the catalyst in the same direction, and then directly passing the hot gases in the same direction through and in actual contact with said catalyst, and finally varying the amount of gases flowing directly from the catalyst.

13. In the synthetic production of ammonia the steps which consist in first passing the incoming gases under high pressures and temperatures in unrestricted thermal contact with the catalyst and then directly through and in actual contact, but out of direct contact with said catalyst, the direction of gas flow being concurrent throughout.

14. In the synthetic production of ammonia the steps which consist in first passing the incoming gases under high pressures and temperatures by a plurality of separate streams through and in unrestricted thermal contact, but out of direct contact with the catalyst and then directly through and in actual contact with said catalyst, the direction of gas flow being concurrent throughout.

RALPH S. RICHARDSON.